United States Patent [19]

Konaya

[11] Patent Number: 4,909,622
[45] Date of Patent: Mar. 20, 1990

[54] MICROFILM RETRIEVAL DEVICE

[75] Inventor: Yoshikazu Konaya, Ayase, Japan

[73] Assignee: Fuji Photo Film Co., Ltd., Kanagawa, Japan

[21] Appl. No.: 230,231

[22] Filed: Aug. 9, 1988

Related U.S. Application Data

[63] Continuation-in-part of Ser. No. 11,862, Feb. 4, 1987, abandoned.

[30] Foreign Application Priority Data

Feb. 15, 1986 [JP] Japan .................................. 61-31099

[51] Int. Cl.⁴ ............................................. G03B 23/12
[52] U.S. Cl. ................................................. 353/26 R
[58] Field of Search ........................... 353/26 R, 26 A; 242/203, 205; 352/124

[56] References Cited

U.S. PATENT DOCUMENTS

| | | | |
|---|---|---|---|
| 3,141,626 | 7/1964 | Koskin | 242/203 |
| 3,203,636 | 8/1965 | Owen | 242/203 |
| 4,028,552 | 6/1977 | Volk | 353/26 A X |
| 4,043,652 | 8/1977 | Mickelson | 353/26 A |
| 4,456,201 | 6/1984 | Frias | 353/26 R X |

Primary Examiner—Harry N. Haroian
Attorney, Agent, or Firm—Wenderoth, Lind & Ponack

[57] ABSTRACT

A microfilm retrieval includes first and second motors for respectively conveying at a high speed a winding section and rewinding section. The winding section and rewinding section are provided with a pair of nip rollers therebetween so as to hold the microfilm. A rotary shaft is axially mounted to the nip rollers and is connected to a low speed motor via an electromagnetic clutch in order to convey the microfilm in both directions at a low speed. First through fourth controllers are respectively provided for controlling the first and second motors, the electromagnetic clutch, and low speed motor. Additionally, a fifth controller is provided for driving the first and second controllers, and a detector is provided for detecting image frames on the microfilm.

5 Claims, 3 Drawing Sheets

MICROFILM RETRIEVAL DEVICE

CROSS-REFERENCE TO RELATED APPLICATION

This application is a continuation in part of our prior application Ser. No. 011,862, filed on Feb. 4, 1987, entitled "Microfilm Retrieval Device", and now abandaned.

BACKGROUND OF THE INVENTION

The present invention relates to a microfilm retrieval device which can precisely position a frame of a microfilm at a desired position by instantly suspending the conveyance of the microfilm for retrieval.

FIG. 1 is a schematic view of a prior art microfilm retrieval device, to which the present invention is applicable. In the figure, a cartridge 41 around which a roll of microfilm 1 is wound is housed in a cartridge box 40 at the feeding side. The microfilm 1 which is automatically rewound from the cartridge 41 is automatically wound around an automatic reel 42 at a winding side through a retrieval section 50. The microfilm 1 is conveyed at a high speed by DC motors MH1 and MH2 for high speed conveyance which rotate the cartridge 41 and the automatic reel 42 respectively. At the same time, the microfilm 1 is conveyed at a low speed in a direction of an arrow M or N in the drawing by a conveyor mechanism 2 comprising a DC motor ML for low speed conveyance which is provided between the cartridge 41 and the automatic reel 42 and which can rotate in both directions one of a pair of nip rollers 3 for the low speed conveyance which is provided to hold the microfilm 1 therebetween. The light is irradiated onto the microfilm 1 from a light source 51 of the retrieval section 50, and the light transmitted through the microfilm 1 is converged by a lens system 52, and is transmitted to a reader/printer section (not shown) as image data of the microfilm 1 to position a desired frame and suspend the conveyance. In such a microfilm retrieval device, blip marks 6 are conventionally provided on each frame on the microfilm 1 in order to detect the necessary frames as shown in FIG. 2. The blip marks 6 are detected on the microfilm 1 at the retrieval section 50 by a sensor such as a photodiode (not shown). When the blip mark of the desired frame is detected, a stop signal is generated from a controller section (not shown) to suspend the conveyance of the microfilm 1. Detection and positioning of each frame are carried out in this manner.

At the high speed retrieval, the microfilm 1 is conveyed by the DC motors MH1 and MH2 while the DC motor ML used for the conveyor mechanism 2 is connected/disconnected to and from the nip rollers 3. When disconnected, the nip rollers 3 become freely slidable and are moved to rotate with the friction against the microfilm 1 which is being conveyed therebetween. After the microfilm 1 is conveyed at the high speed and the target image frame approaches to the retrieval section 50, the power source is switched to the DC motor ML for low conveyance and the target image frame is retrieved. However, even though it may be conveyed at the low speed, the DC motor ML for the low speed conveyance cannot immediately stop when receiving the stop signal due to fluctuation in loads, inertia caused by rotating parts deviation and the time lag in response by an electromagnetic clutch. The desired image frame of the microfilm 1 cannot consequently be positioned at the center of the target position. The prior art retrieval device is therefore defective in that the image frame has to be manually adjusted positionwise each time, which is time-consuming as well as imposing extra burden on the operators.

SUMMARY OF THE INVENTION

The present invention was contrived in view of the above situation and aims to provide a microfilm retrieval device which can convey the microfilm at a high speed until a target frame approaches, and then at a low speed, when the target frame is detected, instantly suspends the conveyance of the microfilm so that the image frame is precisely positioned at a specified position.

According to one aspect of the present invention, for achieving the objects described above, there is provided a microfilm retrieval device comprising a screen for projecting image frames of a microfilm roll for retrieval; a first and a second motors for high speed conveyance provided at a winding section and a rewinding section of said microfilm, respectively; a pair of nip rollers provided between the winding section and the rewinding section of said microfilm so as to hold the microfilm therebetween; a rotary shaft axially mounted to said nip rollers; a low speed conveyance motor which is connected to said rotary shaft via an electromagnetic clutch for conveying said microfilm in both directions at a low speed; a first and a second controllers for controlling the first and the second motors, respectively; a third controller for controlling said electromagnetic clutch; a fourth controller for controlling said low speed conveyance motor; a detector for detecting said image frames; and a fifth controller which drives the first and the second motors via the first and the second controllers so as to convey said microfilm at a high speed for said winding section, when a near frame of a target frame is detected by said detector, enables said electromagnetic clutch via the third controller and drives said low speed conveyance motor via the fourth controller so as to convey said microfilm at said low speed with dynamic breaking of the second or the first motor of said rewinding section, and when said target frame is detected by said detector, stops to apply power voltage to said low speed conveyance motor while still enabling said electromagnetic clutch so to effect dynamic braking by said low speed conveyance motor to thereby position said target frame of said microfilm instantly and precisely at a predetermined position.

The nature, principle and utility of the invention will become more apparent from the following detailed description when read in conjunction with the accompanying drawings.

DETAILED DESCRIPTION OF THE INVENTION

Figure 1:
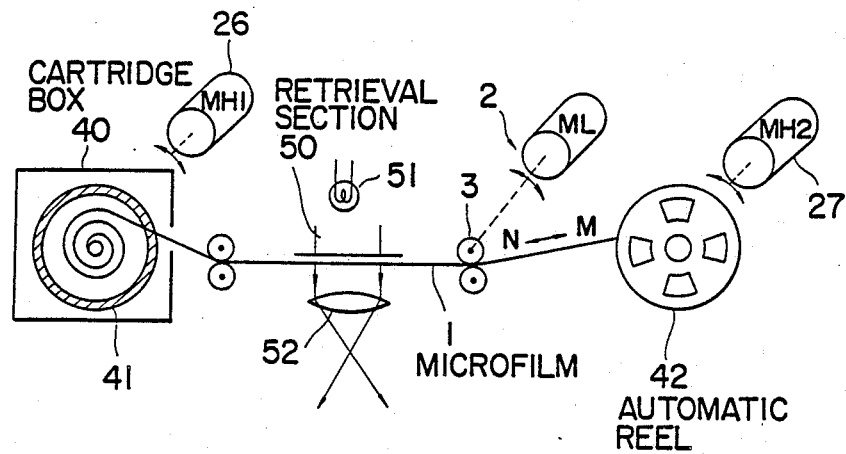
FIG. 1 shows a schematic view of a prior art microfilm retrieval device to which the present invention is applicable.
Figure 2:
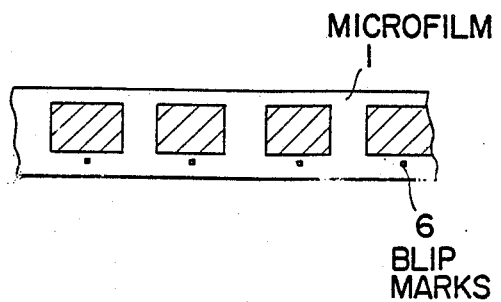
FIG. 2 is a view of a microfilm with blip marks.

According to the present invention, in a microfilm retrieval device as shown in FIG. 1, for example, a microfilm 1 is conveyed at a high speed by DC motors MH1 and MH2 for high speed conveyance which drive a cartridge 41 and an automatic reel 42. When the microfilm 1 is conveyed at a low speed, nip rollers 3 which tightly hold the microfilm 1 from both sides is axially connected to a lower speed conveyance DC motor by an electromagnetic clutch, and a predetermined voltage is still applied on a winding side of the DC motor MH1 or MH2 and dynamic braking is applied to a rewinding side thereof so that the microfilm 1 is controlled not to become warped during transportation. At the same time, the lower speed conveyance DC motor in response to a stop signal from a control section is suspended so as to thereby apply dynamic braking of the low speed conveyance motor so that the conveyance of the microfilm 1 is instantly stopped to enable accurate positioning.

Figure 3:
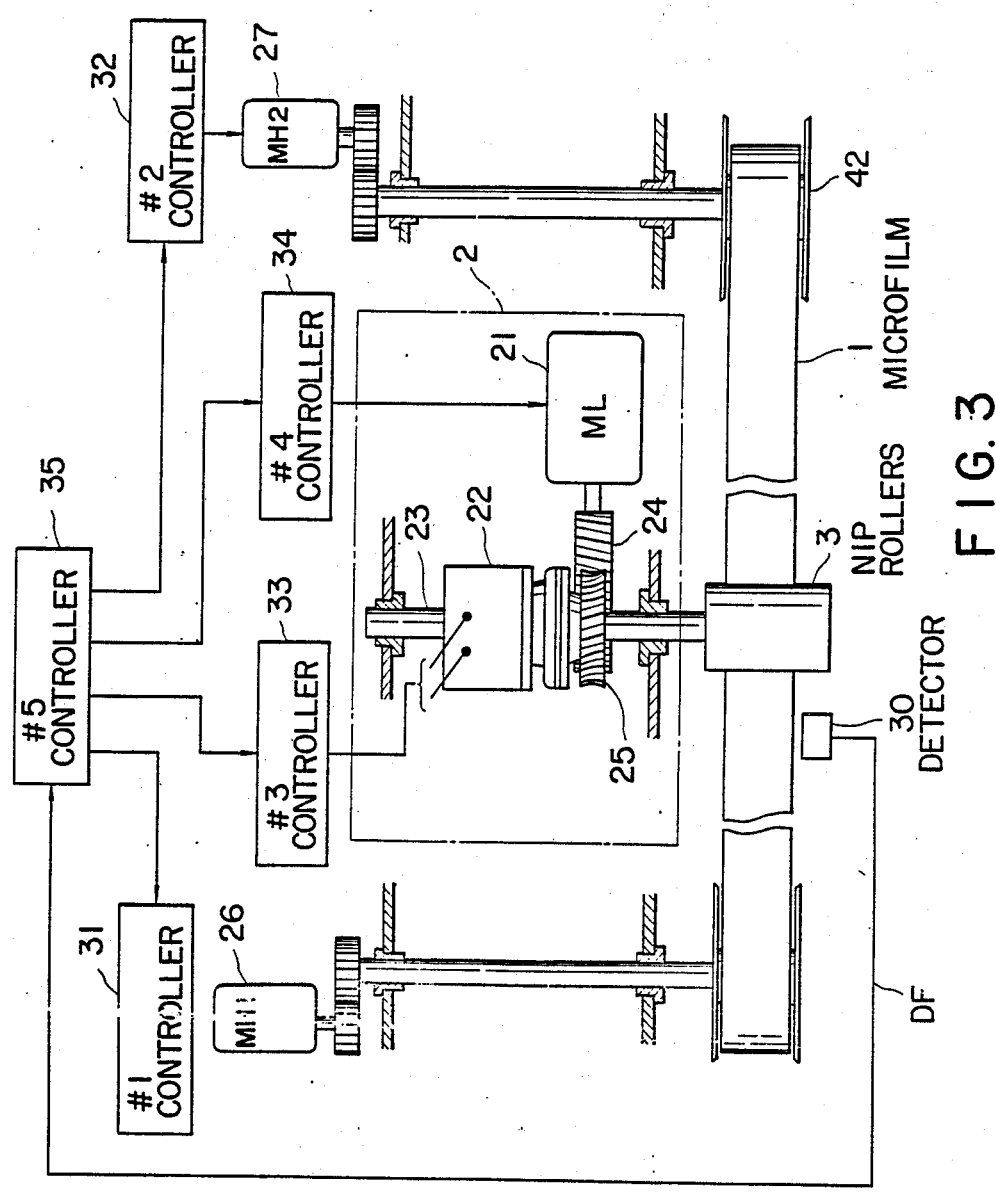
FIG. 3 is a schematic view to show one example of the present invention.

The present invention is now described in detail referring to FIG. 3.

FIG. 3 briefly shows an outer appearance of a conveyor mechanism 2 which is used for the microfilm retrieval device according to the present invention. In the figure, a low speed conveyance DC motor (ML) 21 is axially mounted for example to a worm 24 which is a means for changing speed while a worm gear 25 which engages with the worm 24 is operatively connected to a rotary shaft 23 via an electromagnetic clutch 22. The DC motors 26 and 27 for high speed conveyance are respectively controlled by controllers (drivers) 31 and 32, the low speed conveyance motor 21 is controlled by a controller (driver) 34 and the electromagnetic clutch 22 is controlled by a controller (driver) 33. The controllers 31 to 34 are controlled by a controller 35 such as a microprocessor, and a detector 30 for detecting a frame of the microfilm 1 is provided at a retrieval section and a detected signal DF by the detector 30 is inputted into the controller 35. One end of the rotary shaft 23 is axially mounted to nip rollers 3. When the electromagnetic clutch 22 is enabled via the controller 33, the revolution of the low speed conveyance DC motor 21 is transmitted to the worm 24, the worm gear 25, the electromagnetic clutch 22 and the nip rollers 3 via the rotary shaft 23. When the above electromagnetic clutch 22 is disabled via the controller 33, the nip rollers 3 become freely slidable and capable of moving in slave with the friction against the microfilm 1 which is conveyed therebetween at a high speed by the DC motors 26 and 27 for the high speed conveyance.

Figure 4:
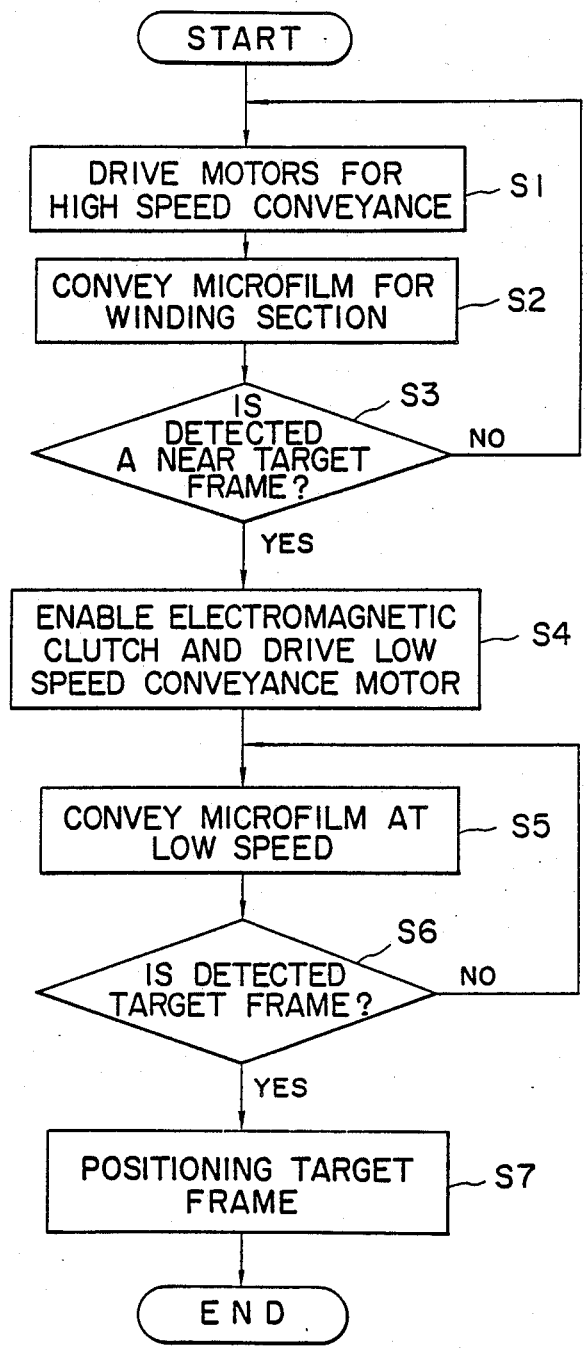
FIG. 4 is a flow chart to show an operation of the controller in FIG. 3.

In the conveyor mechanism 2 of the above construction as shown in FIG. 3, the operation will be explained referring to FIG. 4.

The controller 35 drives the DC motors 26 and 27 by applying power voltage via the controller 31 and 32 so as to convey the microfilm 1 at a high speed for a winding section (Steps S1 and S2), and the low speed conveyance DC motor 21 and the electromagnetic clutch 22 are in the "OFF" state when the microfilm 1 is transported at the high speed. The nip rollers 3 are freely rotated in accordance with the friction against the microfilm 1 which is conveyed at the high speed in both directions by the DC motors 26 and 27 for the high speed conveyance. When the target frame of the microfilm 1 approaches to the retrieval section, a near frame of a target frame for the retrieval is detected by the detector 30 (Step S3), and then the conveyance speed is changed to a low speed. That is, when the controller 35 inputs a detected signal DF of the near frame from the detector 30, the controller 35 enables the electromagnetic clutch 22 via the controller 33 and drives the DC motor 21 via the controller 34 (Step S4) so as to convey the microfilm 1 at the low speed (Step S5). The electromagnetic clutch 22 allows the worm 24 to engage with the worm gear 25, which then is connected to the rotary shaft 23. The revolution of the DC motor 21 is transmitted to the rotary shaft 23 and conveys the microfilm 1 which is held between the nip rollers 3 at the low speed. Although a predetermined amount of voltage is still applied to the winding side of the DC motor 26 or 27, a rewinding side thereof becomes to a state that is not applied with any power voltage to make dynamic braking work so that the microfilm 1 may be conveyed without becoming loosely wound.

When the detector 30 detects the target frame with blip mark 6, (Step S6) the controller 35 outputs a stop signal to the controller 34 and stops to apply the power voltage to the DC motor 21 via the controller 34 while maintaining the electromagnetic clutch 22 in the "ON" state in order to simultaneously stop the microfilm 1 at a target position. Since the torque of the DC motor 21 is larger than that of the winding side of the DC motor 26 or 27, the microfilm 1 can be instantly suspended at a specified position (Step S7). When the target frame of the microfilm 1 stops at the specified position as explained above, the DC motor 26 or 27 of the winding section is switched to "OFF", and the electromagnetic clutch 22 "ON", preventing a positional deviation which might otherwise be caused due to reaction of tension in the microfilm 1 at the moment of suspension. Then the retrieval operation is completed.

To start the retrieval of the next frame, the DC motors 26 and 27 for the high speed conveyance, the DC motor 21 for the low speed conveyance and the electromagnetic clutch 22 are controlled via the controller 35 so that the microfilm 1 is conveyed at high speed again for the retrieval.

As explained above, if the microfilm retrieval device according to the present invention is used for the retrieval, the microfilm can be conveyed at a high speed using the DC motors for high speed conveyance until the target frame approaches to the retrieval section. The microfilm then can be transported at a low speed using the DC motor for low speed conveyance and controlling the rewinding side of the DC motors for the high speed conveyance to apply dynamic braking. Loose winding can thus be prevented in this manner. In addition, when the target image frame is retrieved, the DC motor for the low speed conveyance is also stopped to apply dynamic braking together with that of the DC motors for the high speed conveyance. The conveyance of the microfilm is thus instantly stopped to position the target frame at a specified position. The time required for retrieval can thus be shortened while the operator's work is reduced.

It should be understood that many modifications and adaptations of the invention will become apparent to those skilled in the art and it is intended to encompass such obvious modifications and changes in the scope of the claims appended hereto.

What is claimed is:

1. A microfilm retrieval device comprising:

a first and a second motor for high speed conveyance provided at a winding section and a rewinding section of a microfilm, respectively;

a pair of nip rollers provided between said winding section and said rewinding section of said microfilm so as to hold the microfilm therebetween;

a rotary shaft axially mounted to said nip rollers;

a low speed conveyance motor which is connected to said rotary shaft via an electromagnetic clutch for conveying said microfilm in both directions at a low speed;

a first and a second controller for controlling said first and second motors, respectively;

a third controller for controlling said electromagnetic clutch;

a fourth controller for controlling said low speed conveyance motor;

a detector for detecting image frames of said microfilm; and a fifth controller for driving said first and second motors via said first and second controllers so as to convey said microfilm at a high speed for said winding section, and when a near frame of a target frame is detected by said detector, for enabling said electromagnetic clutch via said third controller and for driving said low speed conveyance motor via said fourth controller so as to convey said microfilm at said low speed with dynamic braking of said second or said first motor of said rewinding section, and when said target frames is detected by said detector, for stopping the application of power to said low speed conveyance motor while still enabling said electromagnetic clutch so to effect dynamic braking by said low speed conveyance motor to thereby position said target frame of said microfilm instantly and precisely at a predetermined position.

2. A microfilm retrieval device as claimed in claim 1, wherein said microfilm is provided with blip marks and positioning of said microfilm is carried out by detecting said blip marks with said detector.

3. A microfilm retrieval device as claimed in claim 1, wherein said motors for high speed conveyance are operatively connected to microfilm reels via gear trains respectively.

4. A microfilm retrieval device as claimed in claim 1, wherein a worm and a worm gear are operatively connected between said rotary shaft and the low speed conveyance motor.

5. A microfilm retrieval device as claimed in claim 4, wherein said worm is connected to said low speed conveyance motor while said worm gear is connected to said rotary shaft.

* * * * *